United States Patent
Fu et al.

(10) Patent No.: US 10,262,380 B2
(45) Date of Patent: Apr. 16, 2019

(54) MEASURING MEMBER VALUE IN SOCIAL NETWORKS

(71) Applicant: LinkedIn Corporation, Mountain View, CA (US)

(72) Inventors: Xin Fu, Santa Clara, CA (US); Joonhyung Lim, San Jose, CA (US); Huangming Xie, Menlo Park, CA (US); Seyedehmina Doroud, Millbrae, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 352 days.

(21) Appl. No.: 15/253,180

(22) Filed: Aug. 31, 2016

(65) Prior Publication Data
US 2018/0060434 A1   Mar. 1, 2018

(51) Int. Cl.
*G06F 16/00* (2019.01)
*G06Q 50/00* (2012.01)
*G06F 16/9536* (2019.01)
*G06Q 30/02* (2012.01)

(52) U.S. Cl.
CPC ............. *G06Q 50/01* (2013.01); *G06F 16/00* (2019.01); *G06F 16/9536* (2019.01); *G06Q 30/0201* (2013.01)

(58) Field of Classification Search
None
See application file for complete search history.

(56) References Cited

U.S. PATENT DOCUMENTS

2013/0212479 A1 *   8/2013   Willis ................... G06Q 10/10
                                                     715/736

* cited by examiner

*Primary Examiner* — Bai D Vu
(74) *Attorney, Agent, or Firm* — Park, Vaughan, Fleming & Dowler LLP; Chia-Hsin Suen

(57) ABSTRACT

The disclosed embodiments provide a system for processing data. During operation, the system obtains a count of actions associated with a member of a social network, wherein the count comprises a set of action types and a number of actions associated with the member for each of the action types. Next, the system uses the count to calculate a set of scores for measuring the value of the social network to the member, wherein the set of scores is associated with researching and contacting people, building a network, keeping up with connections, staying informed and building knowledge, establishing and managing a reputation, and getting hired. The system then outputs the scores for use in characterizing and improving the value of the social network for the member.

20 Claims, 4 Drawing Sheets

MEASURING MEMBER VALUE IN SOCIAL NETWORKS

BACKGROUND

Field

The disclosed embodiments relate to social networks. More specifically, the disclosed embodiments relate to techniques for measuring member value in social networks.

Related Art

Social networks may include nodes representing individuals and/or organizations, along with links between pairs of nodes that represent different types and/or levels of social familiarity between the nodes. For example, two nodes in a social network may be connected as friends, acquaintances, family members, classmates, and/or professional contacts. Social networks may further be tracked and/or maintained on web-based social networking services, such as online professional networks that allow the individuals and/or organizations to establish and maintain professional connections, list work and community experience, endorse and/or recommend one another, run advertising and marketing campaigns, promote products and/or services, and/or search and apply for jobs.

In turn, social networks and/or online professional networks may facilitate business activities such as sales, marketing, and/or recruiting by the individuals and/or organizations. For example, sales professionals may use an online professional network to locate prospects, maintain a professional image, establish and maintain relationships, and/or engage with other individuals and organizations. Similarly, recruiters may use the online professional network to search for candidates for job opportunities and/or open positions. Consequently, use of social networks may be improved by mechanisms for characterizing and/or increasing the value of the social networks to members of the social networks.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
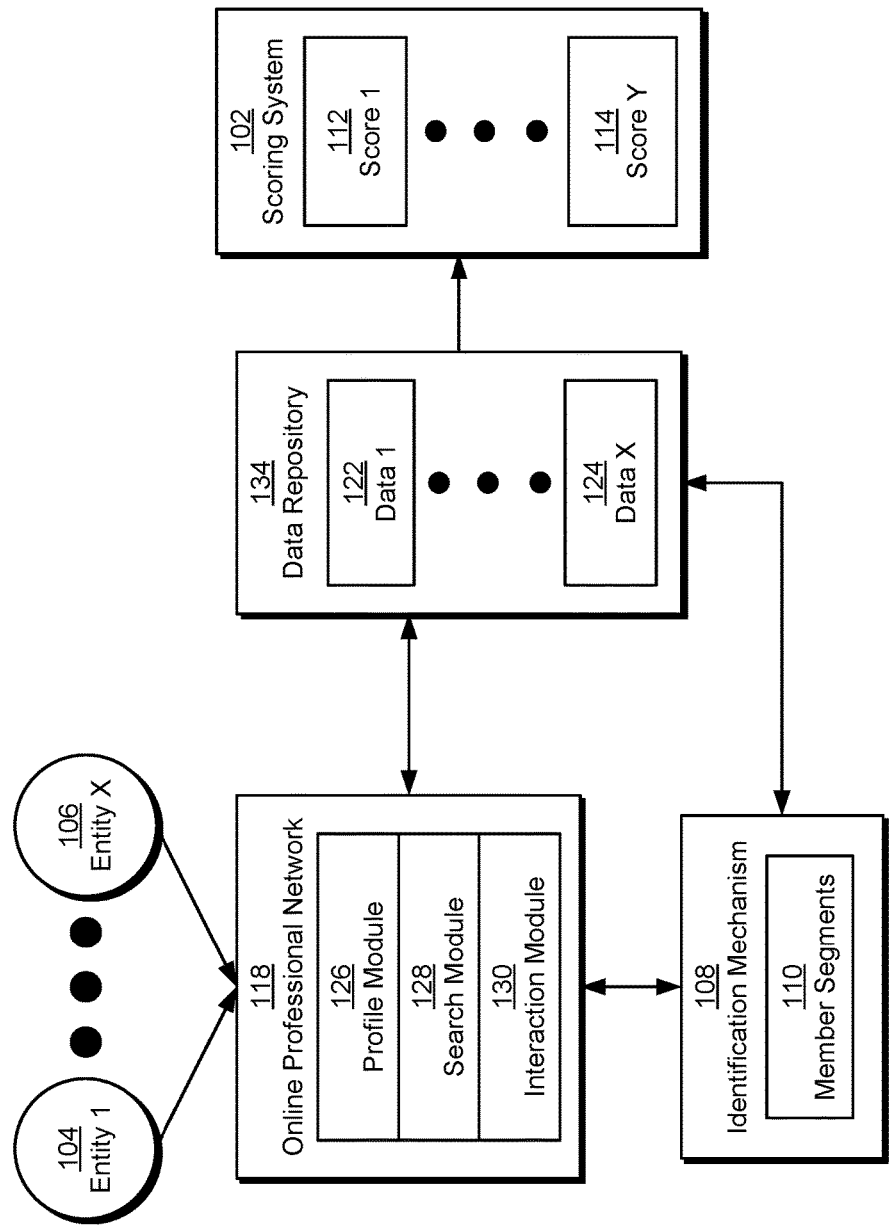
FIG. 1 shows a schematic of a system in accordance with the disclosed embodiments.

The disclosed embodiments provide a method, apparatus, and system for processing data. More specifically, the disclosed embodiments provide a method and system for measuring the value of a social network to members of the social network. As shown in FIG. 1, the social network may be an online professional network 118 that allows a set of entities (e.g., entity 1 104, entity x 106) to interact with one another in a professional and/or business context.

The entities may include users that use online professional network 118 to establish and maintain professional connections, list work and community experience, endorse and/or recommend one another, search and apply for jobs, and/or perform other actions. The entities may also include companies, employers, and/or recruiters that use the online professional network to list jobs, search for potential candidates, provide business-related updates to users, advertise, and/or take other action.

The entities may use a profile module 126 in online professional network 118 to create and edit profiles containing information related to the entities' professional and/or industry backgrounds, experiences, summaries, projects, skills, and so on. The profile module may also allow the entities to view the profiles of other entities in the online professional network.

The entities may use a search module 128 to search online professional network 118 for people, companies, jobs, and/or other job- or business-related information. For example, the entities may input one or more keywords into a search bar to find profiles, job postings, articles, and/or other information that includes and/or otherwise matches the keyword(s). The entities may additionally use an "Advanced Search" feature in the online professional network to search for profiles, jobs, and/or information by categories such as first name, last name, title, company, school, location, interests, relationship, industry, groups, salary, experience level, etc.

The entities may also use an interaction module 130 to interact with other entities on online professional network 118. For example, the interaction module may allow an entity to add other entities as connections, follow other entities, send and receive messages with other entities, join groups, and/or interact with (e.g., create, share, re-share, like, and/or comment on) posts from other entities.

Those skilled in the art will appreciate that online professional network 118 may include other components and/or modules. For example, the online professional network may include a homepage, landing page, and/or content feed that provides the latest postings, articles, and/or updates from the entities' connections and/or groups to the entities. Similarly, the online professional network may include features or mechanisms for recommending connections, job postings, articles, and/or groups to the entities.

In one or more embodiments, data (e.g., data 1 122, data x 124) related to the entities' profiles and activities on online professional network 118 is aggregated into a data repository 134 for subsequent retrieval and use. For example, each profile update, profile view, connection, follow, post, comment, like, share, search, click, message, interaction with a group, and/or other action performed by an entity in the online professional network may be tracked and stored in a database, data warehouse, cloud storage, and/or other data-storage mechanism providing the data repository.

The data may be used by an identification mechanism 108 to identify and/or generate a set of member segments 110 in online professional network 118. Each member segment may include a group of entities that share one or more common attributes. For example, member segments may be defined and/or created based on the entities' locations, languages, industries, companies, schools, first-degree networks, second-degree networks, seniorities, follows, roles (e.g., influencer, career builder, senior leader, sales professional, recruiter, etc.), group memberships, usage frequencies (e.g., a number of days in the past number of weeks, a number of visits in the previous day, etc.), and/or other attributes in data repository 134. The member segments may also be based on behavior such as posting articles and/or uploading photos to the online professional network.

After member segments 110 are generated, a scoring system 102 may calculate a set of scores (e.g., score 1 112, score y 114) for entities in one or more member segments and/or all entities in online professional network 118. As with other data related to the entities, the scores may be stored in data repository 134 and/or another repository for subsequent retrieval and use.

As described in further detail below, the scores may characterize different types of value provided by online professional network 118 to the entities. For example, the scores may measure the entities' use of value propositions such as researching and contacting people, building a network, keeping up with connections, staying informed and building knowledge, establishing and managing a reputation, and/or getting hired. As a result, the scores may be used to identify the value of the online professional network for different member segments 110, track the impact of product decisions and/or features on the members and/or value propositions, identify trends in use of the online professional network, and/or detect events associated with the entities.

Figure 2:
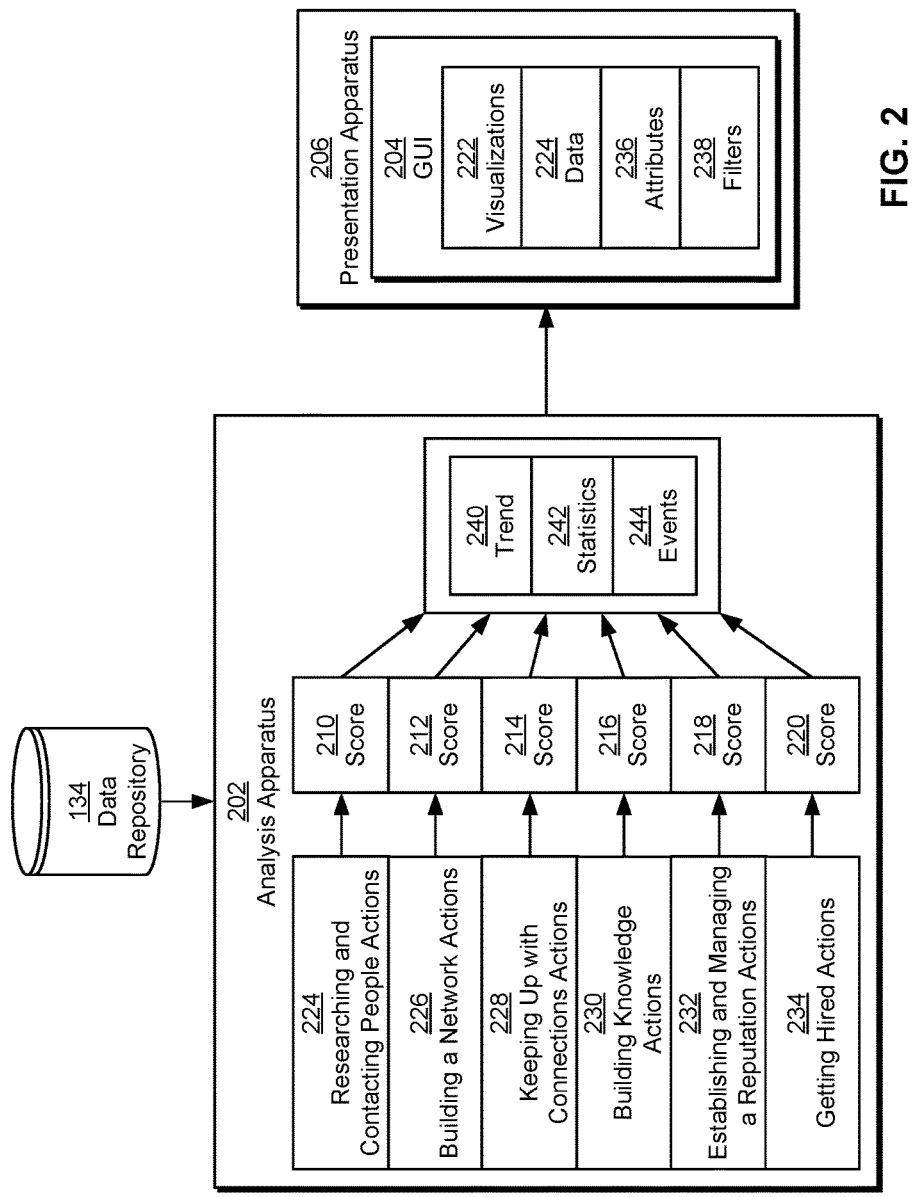
FIG. 2 shows a system for processing data in accordance with the disclosed embodiments.

FIG. 2 shows a system for processing data in accordance with the disclosed embodiments. More specifically, FIG. 2 shows a system for calculating and using scores representing member value in social networks, such as scoring system 102 of FIG. 1. The system includes an analysis apparatus 202 and a presentation apparatus 206. Each of these components is described in further detail below.

Analysis apparatus 202 may calculate a set of scores 210-220 for each member (e.g., user) of a social network (e.g., online professional network 118 of FIG. 1) using a set of data associated with the member from data repository 134. Each score may represent the amount by which the member derives value from a corresponding value proposition and/or category in the social network. As a result, different scores may be calculated from different subsets of data for the member in the data repository.

In particular, scores 210-220 may be computed using a count of actions associated with the member. The count may specify the number of actions performed and/or received by the member for a number of different action types. The count may also be generated and/or refreshed over a pre-specified period (e.g., a day, a week, two weeks, a month, etc.) and stored in data repository 134 and/or another repository for subsequent retrieval and use. The scores may then be calculated from the count on a real-time or periodic basis. For example, the scores may be calculated daily using a count of actions from the preceding week.

To improve the accuracy of scores 210-220, an action may be added to the count when the action represents clear value to the member. For example, a search action may be included in the count only when the member clicks on search results and not when the member submits a search query. In another example, actions associated with emails or notifications from the social network may be included in the count only when the actions occur after the member has navigated to the social network through the emails or notifications. In a third example, a messaging action may be included in the count only after the member both receives and responds to a message. The inclusion or exclusion of specific actions or types of actions in the count may be adjusted over time to better reflect the corresponding value obtained by members of the social network and/or the corresponding "strength" or importance of the actions or types of actions.

In addition, one or more action types and/or value propositions may be associated with a directionality that affects the calculation of the corresponding scores. For example, value propositions that originate from the member may include keeping in touch with the member's network and researching and contacting people, and value propositions that terminate at the member may include establishing and managing a reputation. In another example, action types such as endorsements, messages, searches, profile views, feed interactions (e.g., posts, comments, likes, shares, etc.), and/or other interactions between the member and another member may be tracked separately based on the member's role as initiator or recipient of the interactions.

As shown in FIG. 2, score 210 may be calculated from a number of researching and contacting people actions 224, which may include profile views of other members' profiles by the member and/or messaging between the member and another member who is not a recruiter. As a result, score 210 may represent the amount by which the member leverages the ability to identify and know other members in the social network.

Score 212 may be calculated from a number of building a network actions 226, which may include establishing new connections between the member and other members of the social network. Thus, score 212 may reflect the amount by which the member increases his/her connectivity and/or networking opportunities in the social network.

Score 214 may be calculated from a number of keeping up with connections actions 228, which may include feed interactions (e.g., likes, comments, shares, etc.) by the member with the member's network, endorsements by the member, recommendations by the member, and/or messaging from the member. In other words, score 214 may represent the member's level of interaction with the member's first-degree and/or extended network.

Score 216 may be calculated from a number of building knowledge actions 230, which may include impressions of articles, educational content, and/or other types of longer-form content by the member. Consequently, score 216 may indicate the extent to which the member uses the social network to gain information and knowledge.

Score 218 may be calculated from a number of establishing and managing a reputation actions 232, which may include interactions by other members with posts created by the member, endorsements of the member by other members, recommendations of the member by other members, other members' messaging with the member, and/or other members viewing a member profile for the member. Put another way, score 218 may reflect the extent to which the member receives interactions from other members.

Score 220 may be calculated from a number of getting hired actions 234, which may include messaging between the member and a recruiter, job impressions served to the member, and/or job applications submitted by the member. That is, score 220 may identify the amount by which the member uses the social network to look for jobs.

In one or more embodiments, scores 210-220 are calculated based on a set of thresholds and/or weights associated with the corresponding action types and value propositions. As with other data used to calculate the scores, analysis apparatus 202 may obtain the thresholds and/or weights from data repository 134 and/or another repository, or the thresholds and/or weights may be maintained in memory or storage on the analysis apparatus. Each threshold may represent a "full value" gained from the corresponding action type when the action type is applied to a certain value proposition. For example, the threshold may specify the number of actions of the action type to be performed and/or received by the member for the member to fully utilize the action type to derive value in the value proposition.

Each threshold and/or weight may be based on the corresponding frequency distribution for the action type and/or input from users or subject matter experts associated with the corresponding value proposition. For example, the threshold may be selected as the number of actions represented by the $95^{th}$ percentile in the frequency distribution of the action type. The threshold may alternatively or additionally include the number of actions defined by a product team associated with the value proposition as the "full value" for the action type. In another example, the weight may be proportional to the inverse frequency of the corresponding action type, so that action types that are more rare are given more weight and thereby impart more value to the member. As with the threshold, the weight may be set and/or revised based on a product owner's assessment of the amount of value, importance, and/or "strength" associated with the action type for the corresponding value proposition.

After the count of actions, the thresholds, and the weights are obtained for a given value proposition, analysis apparatus 202 may calculate a ratio of the member's number of actions to the corresponding threshold for all action types associated with the value proposition. If the number of actions exceeds the threshold, the ratio may be set to 1, since the "full value" is obtained by reaching the threshold. The analysis apparatus may then combine the ratios with the corresponding weights to compute the score for the value proposition.

For example, the count for the member may include one new connection, two endorsements by the member, one endorsement of the member by another member, and two comments by other members on posts by the member. The new connection may map to the value proposition of building a network (actions 226), the endorsements and feed interactions by the member may map to the value proposition of keeping up with connections (actions 228), and the endorsement received by the member may map to the value proposition of establishing and managing a reputation (actions 232). Each corresponding score 212, 214, and 218 may have a value ranging from 0 to 100, which may be computed as the weighted sum of the corresponding thresholds divided by the maximum weighted sum for the value proposition (i.e., the maximum value achieved by having a ratio of 1 for all action types) and multiplied by 100.

To continue this example, the value proposition of building a network (actions 226) may have a threshold of four new connections, a corresponding weight of 100, and a maximum weighted sum of 100. In turn, score 212 may be calculated as $\frac{1}{4}*100/100*100$, or 25 out of 100. The value proposition of keeping up with connections (actions 228) may have a maximum weighted sum of 2000, thresholds of five endorsements by the member and five comments on posts by the member, and corresponding weights of 100 and 300. As a result, score 214 may be calculated as $(\frac{2}{5}*100+\frac{2}{5}*300)/2000*100$, or 8 out of 100. The value proposition of establishing and managing a reputation (actions 232) may have a threshold of 10 endorsements of the member, a corresponding weight of 125, and a maximum weighted sum of 500, resulting in a value of $\frac{1}{10}*125/500*100$, or 2.5 out of 100, for score 218.

After scores 210-220 are calculated based on the count of actions and the applicable thresholds and weights, analysis apparatus 202 may analyze and/or aggregate the scores in a number of ways. First, the analysis apparatus may identify a trend 240 associated with the scores based on the values and/or changes to the scores over time. For example, the analysis apparatus may perform time-series analysis of the scores to detect cyclical, seasonal, irregular, and/or trend components in the scores. The analysis apparatus may also correlate the components with holidays, product releases, and/or other factors that potentially affect the scores.

Second, analysis apparatus 202 may aggregate values of scores 210-220 for multiple members of the social network into a number of statistics 242. For example, the analysis apparatus may combine the scores for members in a member segment and/or the entire social network into a distribution, average, median, percentile, total (e.g., the sum of all scores for all members divided by the sum of the maximum values for the scores), and/or another value or set of values. The analysis apparatus may also use the scores to assess a coverage of the value propositions in the member segment or social network (e.g., the number or percentage of members who have a nonzero score for any value proposition and/or specific value propositions) and/or a diversity of the value propositions (e.g., numbers or percentages of members in the member segment or social network who have nonzero scores for different numbers of value propositions).

Third, analysis apparatus 202 may analyze changes in the counted actions and/or scores 210-220 to detect events 244 associated with the members. For example, the analysis apparatus may match fluctuations or changes to the members' activity and corresponding scores to patterns associated with events such as changes in employment, changes in education, promotions, keynote speeches, acquisitions, mergers, and/or other major life, company, or career events.

Presentation apparatus 206 may then display information associated with scores 210-220, trend 240, statistics 242, and/or events 244 in a graphical user interface (GUI) 204.

For example, presentation apparatus 206 may provide the GUI for use in characterizing, assessing, and managing the value of the social network for various members and/or member segments.

First, presentation apparatus 206 may display one or more visualizations 222 associated with scores 210-220, trend 240, statistics 242, and/or events 244. For example, presentation apparatus 206 may display line charts, bar charts, pie charts, histograms, clusters, and/or other graphical representations of data 224 generated by analysis apparatus 202.

Second, presentation apparatus 206 may display data 224 associated with scores 210-220, trend 240, statistics 242, and/or events 244. For example, the presentation apparatus may include values associated with the scores, trend, statistics, and/or events in an overlay, table, spreadsheet, and/or other user-interface element in GUI 204.

Third, presentation apparatus 206 may display attributes 236 associated with visualizations 222 and/or data 224. For example, the attributes may include the coverage, diversity, trend 240, and/or member segments associated with the visualizations and/or data. The presentation apparatus may also provide a mechanism for downloading and/or exporting the displayed visualizations, data, and/or attributes.

To facilitate analysis of visualizations 222, data 224, and attributes 236, presentation apparatus 206 may provide one or more filters 238. For example, the presentation apparatus may display filters for different member segments, attributes, value propositions, scores, action types, statistics 242, time intervals, and/or visualizations. After one or more filters 238 are selected by a user interacting with GUI 204, presentation apparatus 206 may use the filters to update other components displayed within the GUI.

By calculating and analyzing scores 210-220 associated with various value propositions for the social network, the system of FIG. 2 may improve the understanding of value for various members and member segments of the social network. In turn, the system of FIG. 2 may facilitate the discovery of relationships, patterns, and/or trends associated with the value propositions; gaining of insights associated with the value propositions; and/or the guidance of decisions and/or actions related to the value propositions.

Those skilled in the art will appreciate that the system of FIG. 2 may be implemented in a variety of ways. First, analysis apparatus 202, presentation apparatus 206, and/or data repository 134 may be provided by a single physical machine, multiple computer systems, one or more virtual machines, a grid, one or more databases, one or more filesystems, and/or a cloud computing system. Analysis apparatus 202 and presentation apparatus 206 may additionally be implemented together and/or separately by one or more hardware and/or software components and/or layers.

Second, data used to identify and/or calculate scores 210-220, trend 240, statistics 242, and/or events may be obtained from a number of data sources. For example, data repository 134 may include data from a cloud-based data source such as a Hadoop Distributed File System (HDFS) that provides regular (e.g., hourly) updates to data associated with connections, people searches, and/or profile views. Data repository 134 may also include data from an offline data source such as a Structured Query Language (SQL) database, which refreshes at a lower rate (e.g., daily) and provides data associated with profile content (e.g., profile pictures, summaries, education and work history) and/or profile completeness.

Finally, scores 210-220 may be generated using various techniques. For example, weights, thresholds, and/or action types used to calculate the scores may be adjusted to change the effect of member actions on the corresponding scores and/or generate new scores as value propositions, features, and/or actions in the social network evolve. The weights, thresholds, and/or action types may further be customized to reflect differences in value or value propositions for various members, member segments, and/or other subsets of members in the social network. In another example, one or more scores may be calculated using statistical models such as artificial neural networks, Bayesian networks, support vector machines, clustering techniques, regression models, random forests, gradient boosted trees, bootstrap aggregating, and/or other types of machine learning techniques.

Figure 3:
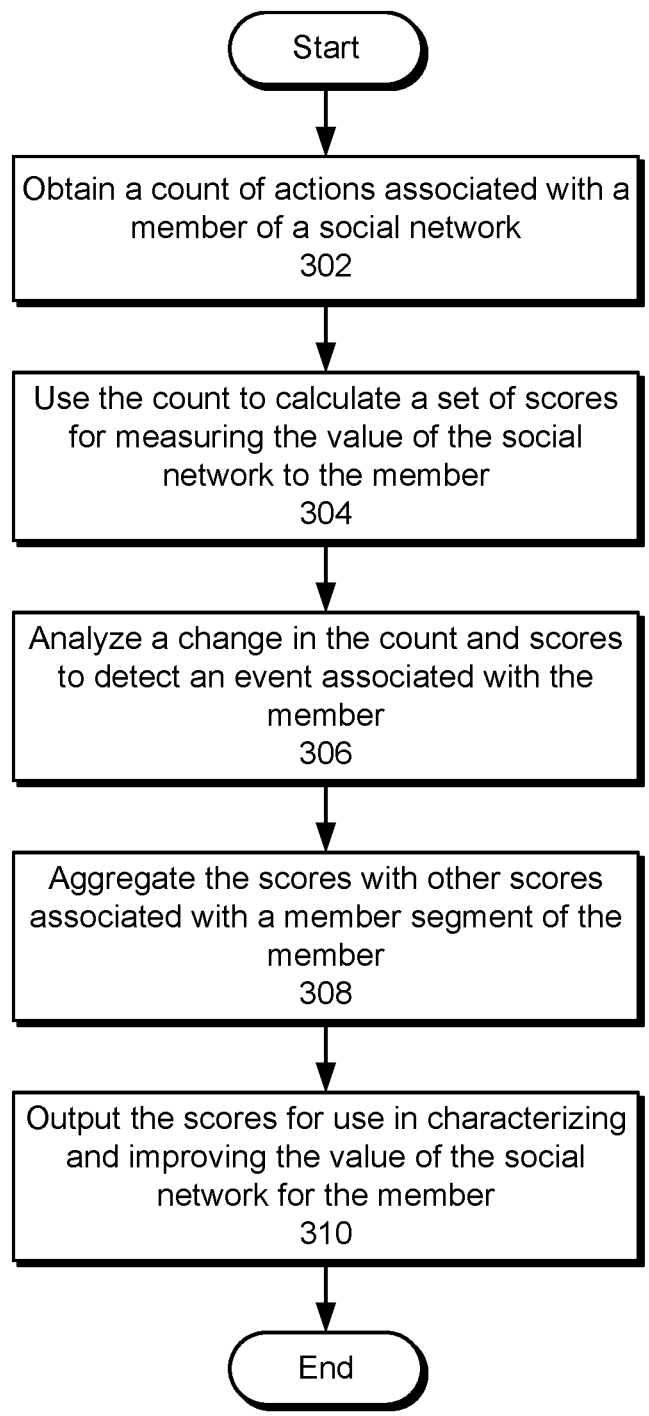
FIG. 3 shows a flowchart illustrating the processing of data in accordance with the disclosed embodiments.

FIG. 3 shows a flowchart illustrating the processing of data in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, a count of actions associated with a member of a social network is obtained (operation 302). The count may specify the number of actions associated with the member for a variety of action types in the social network. For example, the count may include separate sub-counts corresponding to the number of new connections, messages, endorsements, recommendations, profile views, articles, feed interactions, searches, and/or other actions generated by the member, received by the member, and/or otherwise involving the member over a preceding day, week, month, and/or other period.

Next, the count is used to calculate a set of scores for measuring the value of the social network to the member (operation 304). For example, each score may represent a different value proposition for the social network, such as researching and contacting people, building a network, keeping up with connections, staying informed and building knowledge, establishing and managing a reputation, and/or getting hired. The score may be associated with a set of thresholds and weights for the corresponding action types. To calculate the score, a ratio of the number of actions in each action type may be divided by the threshold for the action type. The ratio is then multiplied by the corresponding weight, and the weighted thresholds for all action types associated with the value proposition are summed, averaged, and/or otherwise aggregated into the score.

A change in the count and scores is also analyzed to detect an event associated with the member (operation 306). For example, sudden and/or large changes in values associated with the count and/or scores may be used to identify major life, company, and/or career events affecting the member.

The scores are then aggregated with other scores associated with a member segment of the member (operation 308). For example, values of the scores for multiple members in the member segment may be aggregated into overall scores, averages, percentiles, and/or other statistics. The scores may also be analyzed and/or broken down into a coverage and/or diversity for the member segment. Trends associated with the scores over time (e.g., year-over-year or month-over-month increases or decreases) may additionally be identified.

Finally, the scores are outputted for use in characterizing and improving the value of the social network for the member (operation 310). For example, the scores and/or aggregated scores may be displayed with a set of attributes such as the coverage of the scores, the diversity of the scores, a trend associated with the scores, and/or one or more member segments associated with the scores or aggregated scores. A visualization associated with the scores may also be displayed to further improve analysis and/or understanding of the scores and/or value propositions.

Figure 4:
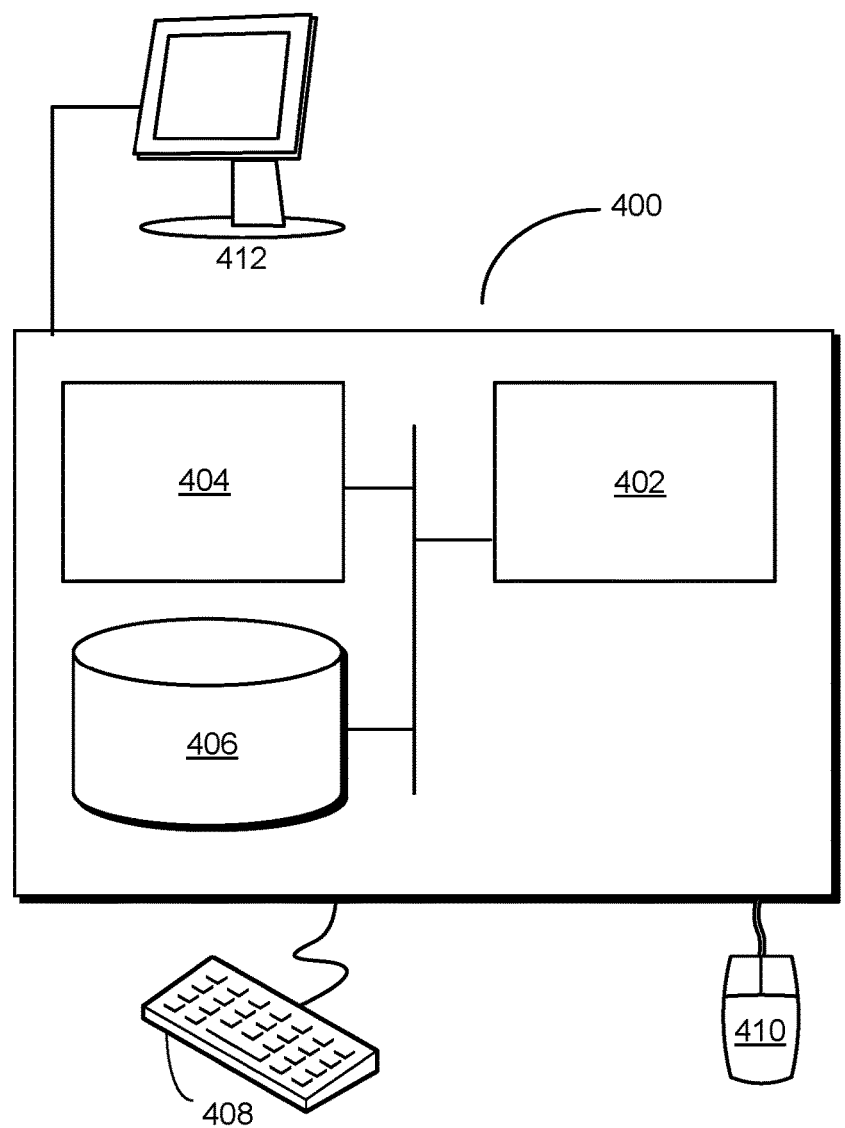
FIG. 4 shows a computer system in accordance with the disclosed embodiments.

FIG. 4 shows a computer system 400 in accordance with the disclosed embodiments. Computer system 400 includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In one or more embodiments, computer system 400 provides a system for processing data. The system may include an analysis apparatus and a presentation apparatus, one or both of which may alternatively be termed or implemented as a module, mechanism, or other type of system component. The analysis apparatus may obtain a count of actions associated with a member of a social network. The count may include a set of action types and a number of actions associated with the member for each of the action types. Next, the analysis apparatus may use the count to calculate a set of scores for measuring the value of the social network to the member. The scores may be associated with value propositions such as researching and contacting people, building a network, keeping up with connections, staying informed and building knowledge, establishing and managing a reputation, and/or getting hired. The presentation apparatus may then output the scores for use in characterizing and improving the value of the social network for the member.

In addition, one or more components of computer system 400 may be remotely located and connected to the other components over a network. Portions of the present embodiments (e.g., analysis apparatus, presentation apparatus, data repository, etc.) may also be located on different nodes of a distributed system that implements the embodiments. For example, the present embodiments may be implemented using a cloud computing system that calculates and outputs a set of scores for a set of remote members to facilitate understanding and management of the value of a social network to the members.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
obtaining a count of actions associated with a member of a social network, wherein the count comprises a set of action types and a number of actions associated with the member for each of the action types;
using the count to calculate, by one or more computer systems, a set of scores for measuring the value of the social network to the member, wherein:
the set of scores is associated with researching and contacting people, building a network, keeping up with connections, and getting hired; and
a subset of the action types associated with getting hired comprises messaging between the member and a recruiter, job impressions, and job applications;
outputting the scores, to a graphical user interface (GUI), for use in characterizing and improving the value of the social network for the member wherein the GUI includes one or more filters to facilitate analysis of information associated with the scores; and
in response to a user interacting with the one or more filters, updating one or more components of the GUI.

2. The method of claim 1, further comprising:
analyzing a change in the count and the scores to detect an event associated with the member.

3. The method of claim 1, wherein using the count to calculate the set of scores for characterizing the value of the social network to the member comprises:
obtaining a set of thresholds associated with the action types; and
calculating a score in the set of scores using a ratio of the number of actions for an action type associated with the score to a threshold for the action type in the set of thresholds.

4. The method of claim 3, wherein calculating the score using the ratio of the number of actions for the action type in the count to the corresponding threshold for the action type in the set of thresholds comprises:
using a set of weights to combine the ratio with other ratios calculated from the count and the thresholds into the score.

5. The method of claim 1, further comprising:
aggregating the scores with other scores associated with a member segment of the member.

6. The method of claim 5, wherein outputting the scores for use in characterizing and improving the value of the social network for the member comprises at least one of:
displaying the scores with a set of attributes associated with the scores;
displaying the aggregated scores for the member segment; and
displaying a visualization associated with the scores.

7. The method of claim 5, wherein the set of attributes comprises at least one of:
a coverage of the scores;
a diversity of the scores;
a trend associated with the scores; and
the member segment.

8. The method of claim 1, wherein the set of scores is also associated with staying informed and building knowledge, and establishing and managing a reputation.

9. The method of claim 8, wherein a subset of the action types associated with staying informed and building knowledge comprises impressions of articles by the member.

10. The method of claim 8, wherein a subset of the action types associated with establishing and maintaining the reputation comprises:
interaction with a post created by the member;
endorsement of the member;
recommendation of the member;
messaging with the member; and
viewing a member profile for the member.

11. The method of claim 1, wherein a subset of the action types associated with researching and contacting people comprises:
profile views by the member; and
messaging involving the member.

12. The method of claim 1, wherein a subset of the action types associated with building the network comprises:
new connections between the member and another member of the social network.

13. The method of claim 1, wherein a subset of the action types associated with keeping up with connections comprises:
feed interactions by the member;
endorsements by the member;
recommendations by the member;
messages from the member.

14. The method of claim 1, further comprising:
performing a time-series analysis of the scores to detect a plurality of components in the scores; and
correlating the plurality of components with a plurality of factors that potentially affect the scores.

15. An apparatus, comprising:
one or more processors; and
memory storing instructions that, when executed by the one or more processors, cause the apparatus to:
obtain a count of actions associated with a member of a social network, wherein the count comprises a set of action types and a number of actions associated with the member for each of the action types;
use the count to calculate a set of scores for measuring the value of the social network to the member, wherein:
the set of scores is associated with researching and contacting people, building a network, keeping up with connections, staying informed and building knowledge, establishing and managing a reputation, and getting hired; and
a subset of the action types associated with getting hired comprises: messaging between the member and a recruiter, job impressions, and job applications;
output the scores, to a graphical user interface (GUI), for use in characterizing and improving the value of the social network for the member, wherein the GUI includes one or more filters to facilitate analysis of information associated with the scores; and
in response to a user interacting with the one or more filters, update one or more components of the GUI.

16. The apparatus of claim 15, wherein using the count to calculate the set of scores for characterizing the value of the social network to the member comprises:
obtaining a set of thresholds associated with the action types; and
calculating a score in the set of scores using a ratio of the number of actions for an action type associated with the score to a threshold for the action type in the set of thresholds.

17. The apparatus of claim 16, wherein calculating the score using the ratio of the number of actions for the action type in the count to the corresponding threshold for the action type in the set of thresholds comprises:
using a set of weights to combine the ratio with other ratios calculated from the count and the thresholds into the score.

18. The apparatus of claim 15, wherein the memory further stores instructions that, when executed by the one or more processors, cause the apparatus to:
aggregate the scores with other scores associated with a member segment of the member.

19. The apparatus of claim 18, wherein outputting the scores for use in characterizing and improving the value of the social network for the member comprises at least one of:
displaying the scores with a set of attributes associated with the scores;
displaying the aggregated scores for the member segment; and
displaying a visualization associated with the scores.

20. A system, comprising:
at least one processor;
memory;
an analysis module comprising a non-transitory computer-readable medium comprising instructions that, when executed by the at least one processor, cause the system to:
obtain a count of actions associated with a member of a social network, wherein the count comprises a set of action types and a number of actions associated with the member for each of the action types; and
use the count to calculate a set of scores for measuring the value of the social network to the member, wherein:
the set of scores is associated with researching and contacting people, building a network, keeping up with connections, staying informed and building knowledge, establishing and managing a reputation, and getting hired; and
a subset of the action types associated with getting hired comprises: messaging between the member and a recruiter, job impressions, and job applications; and
a presentation module comprising a non-transitory computer-readable medium comprising instructions that, when executed by the at least one processor, cause the system to:
output the scores, to a graphical user interface (GUI), for use in characterizing and improving the value of the social network for the member, wherein the GUI includes one or more filters to facilitate analysis of information associated with the scores; and
in response to a user interacting with the one or more filters, update one or more components of the GUI.

* * * * *